United States Patent
Schlachter

[11] Patent Number: 6,106,044
[45] Date of Patent: Aug. 22, 2000

[54] STRUCTURAL MEMBER FOR CREATING AN ACCESSIBLE UNDERSEAT STORAGE ENCLOSURE

[76] Inventor: Bradley S. Schlachter, 10 Abbotsford Ct., Dallas, Tex. 75225

[21] Appl. No.: 09/014,634

[22] Filed: Jan. 28, 1998

[51] Int. Cl.[7] .................................................. B60R 7/04
[52] U.S. Cl. .................................. 296/37.15; 297/188.09
[58] Field of Search ................... 296/37.15; 297/188.08, 297/188.09

[56] References Cited

U.S. PATENT DOCUMENTS

| | | | |
|---|---|---|---|
| D. 254,611 | 4/1980 | Linto | 296/37.15 |
| 3,722,011 | 3/1973 | Miller | 297/188.09 |
| 5,039,155 | 8/1991 | Suman et al. | 296/37.15 |
| 5,096,249 | 3/1992 | Hines | 296/37.15 |

*Primary Examiner*—Gary C. Hoge
*Attorney, Agent, or Firm*—David H. Judson

[57] ABSTRACT

In a vehicle having a foldable passenger seat, there is a storage area underneath the seat or bench. According to the invention, a rigid, substantially u-shaped structural member closes up an opening under the seat to thereby inhibit access to the volume of storage space and form a lockable storage enclosure. The structural member cooperates with existing underseat components to form the novel underseat enclosure. Notches are formed in the upper edge portions of the member to accommodate existing underseat handles.

8 Claims, 6 Drawing Sheets

STRUCTURAL MEMBER FOR CREATING AN ACCESSIBLE UNDERSEAT STORAGE ENCLOSURE

BACKGROUND OF THE INVENTION

1. Technical Field

The present invention relates to a storage enclosure for a foldable seat or bench of a motor vehicle.

2. Description of the Related Art

Storage space in a passenger motor vehicles is limited and not always sufficient for the need of the vehicle owner and user. Tools, equipment, athletic gear, children's toys and other items which are needed or are desirable to have in the vehicle at various times should be put away after use and not left on the seats, in the footwells or in open storage areas such as the rear cargo decks of station wagons, vans and sport utility vehicles, for example. However, these items are often desired to be accessible from the passenger cabin for use by the vehicle operator or passenger, at will, without having to stop the vehicle and retrieve them from a rear closure type compartment or trunk.

One under-utilized space within a vehicle, which can be useful for storing the above-mentioned articles or other items of value which require protection and secure placement, is beneath foldable or removable seats. Many vehicles, such as so-called sport utility type vehicles, vans, trucks and extended cab light duty trucks, have one or more seats which have a foldable or removable seat part under which space may be utilized for storage of various personal items and accessories. As vehicles are downsized and become more compact, there is continuing interest in fully utilizing such available space.

It is known in the prior art to provide underseat storage containers for various and sundry articles. One such device is illustrated in U.S. Pat. No. 5,249,724 issued to Green, and comprises a rectangular bottom, four upstanding sidewalls, and an upstanding lip or edge to retain the container underneath a rearmost bench seat of a minivan type vehicle. U.S. Pat. No. 1,404,484 issued to Schoonmaker, describes a container that is designed to be supported within the frame of a vehicle seat structure. This container includes a hinged cover which forms part of the seat itself. Although such containers are generally useful for their intended purposes, they are overly complex in design due in part to the fact that they are configured to fit specifically to the particular geometry of the seat. This requirement turns out to be unnecessary, as has now been discovered by the present invention.

BRIEF SUMMARY OF THE INVENTION

It is thus a primary object of the present invention to increase the safe and secure storage of various articles that are desired to be carried within a motor vehicle.

It is another object of the invention to provide underseat storage in a vehicle that easy-to-use, secure, lockable, and that exhibits maximum utilization of available storage space.

It is still a further object of the invention to provide underseat lockable storage in a truck or like vehicle using a substantially u-shaped structural member that closes up an otherwise open area under the seat (or "bench") and includes a cutout or notch to accommodate an underlying seat handle when the seat is in its normal, lowered position.

Thus, a further object of the invention is to provide the advantages of lockable storage for a vehicle using the existing underseat structural components for a major part of the enclosure itself. This significantly reduces the cost and complexity of the storage system, and it allows the inventive enclosure to be added as an aftermarket product if desired.

It is a further important object of the invention to provide a unique underseat storage compartment or enclosure for various types of motor vehicles including, without limitation, trucks, light duty trucks, sport utility type vehicles, vans, minivans, stations wagons or other conventional vehicles.

It is another important object of the invention to increase the article storage capability of a truck vehicle (e.g., a Dodge Ram Quad 4Dr. pickup truck) at very low cost using an original-equipment or aftermarket device to create a unique underseat storage enclosure.

It is still another object of the invention to provide for secure, out-of-view, storage of articles in a light duty truck or other similar vehicle having a foldable seat.

It is a further object of this invention to provide an underseat storage compartment formed in part by a bottom surface of the foldable seat itself.

It is still a further object of the invention to provide such a storage compartment that is secure against wrongful entry.

Still another object of this invention is to increase the storage capability of light duty trucks to thereby enable operators or passengers to store tools, equipment, personal belongings, registered firearms and other articles which are desired to be stored out-of-view and out of the way of passengers entering, occupying and leaving the passenger cabin.

In the preferred embodiment, the above objects of the invention are provided in a motor vehicle having a floor, and a seat including a seat part pivotal between a first lowered position and a second raised position upon actuation of an underlying handle. When the seat part is located in the first lowered position, a volume of storage space exists between the seat and the floor accessible though an opening. According to the invention, this existing seat arrangement is augmented with substantially u-shaped structural member supported in the opening for inhibiting access to the volume of storage space through the opening when the seat part is located in the first lowered position. The structural member includes a cutout portion or "notch" for the underlying handle so that the handle may still be accessed even when the seat part is in the first lowered position. Preferably, a locking mechanism is supported within the structural member that cooperates with a locking member (e.g., a bar with an opening therein for receiving a latch) underlying the seat to lock the seat to the structural member. When the locking mechanism is not engaged, the user may access and actuate the seat handle to thereby lift the seat from its lowered position to its raised position. This facilitates access to the volume of storage space.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should now be made to the following Detailed Description taken in conjunction with the following drawings in which.

DETAILED DESCRIPTION OF THE PREFERRED EMBODIMENT

The present invention is shown for exemplary purposes in the passenger cabin of an extended cab light duty truck (such as a Dodge Ram Quad Cab 4Dr), although it should be appreciated the inventive concepts may be implemented in any vehicle having a foldable seat or "bench" spaced from a floor of the vehicle and accessible via a, second, third or fourth door. Such vehicles include, without limitation, passenger cars, vans, minivans, stations wagons, pickup trucks, sport utility type vehicles, jeeps, and the like. The present invention thus is not limited to use within any particular vehicle; rather, the teachings may be applied to any vehicle of domestic or foreign manufacture, as original equipment or aftermarket product. As is well-known, an extended cab light duty truck has one or more seats which have a foldable or removable seat part under which space may be utilized for storage of various personal items and accessories.

Figure 1:
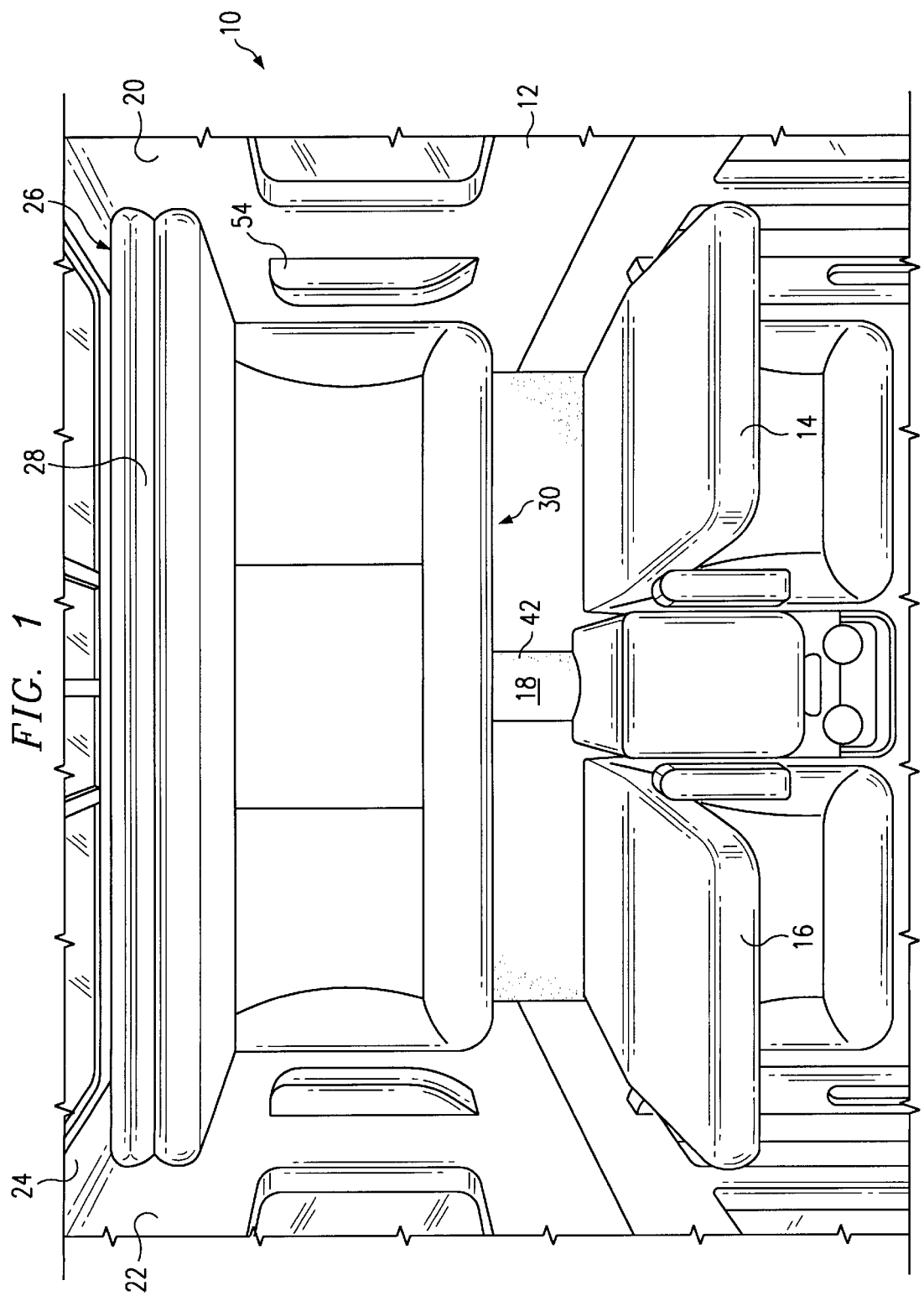
FIG. 1 is a plan view of a portion of a vehicle passenger cabin of a light duty truck with a conventional foldable passenger seat in its lowered or working position.

Referring to FIG. 1, there is shown a portion of a roadable motor vehicle, generally designated by the numeral 10, including a portion of a passenger cabin 10. By way of example only, the vehicle 10 may comprise a light duty or so-called "pickup" truck of a type which has an extended passenger cabin (accessible through a second, third or fourth door) providing a space 18 behind the driver's seat 14 and front passenger seat 16. The space 18 is disposed between opposed cabin sidewalls 20 and 22 and forward of a rear cabin wall 24. The space 18 is adapted to include a passenger seat 26 having a cushioned seatback 28 disposed just forward of the rear wall 24 and a cushioned seat part 30. The passenger cabin 12 includes a generally horizontal cabin floor 40 and a drive shaft clearance tunnel wall 42 projecting upward from the floor 40 in a conventional manner.

The above-described seat arrangement and vehicle are merely exemplary, although they represent one implementation of the enclosure of the present invention. Light duty trucks have a lack of secure storage space, particularly space which can be subdivided into several storage compartments for containing tools, equipment, personal belongs and other articles which are desired to be stored out of view and out of the way of passengers entering, occupying and leaving the passenger cabin. Those skilled in the art will recognize that the description of the vehicle seat and cabin arrangement heretofore set forth, may also represent roadable motor vehicles including so-called sport utility vehicles, vans, station wagons and other passenger carrying motor vehicles.

Figure 2:
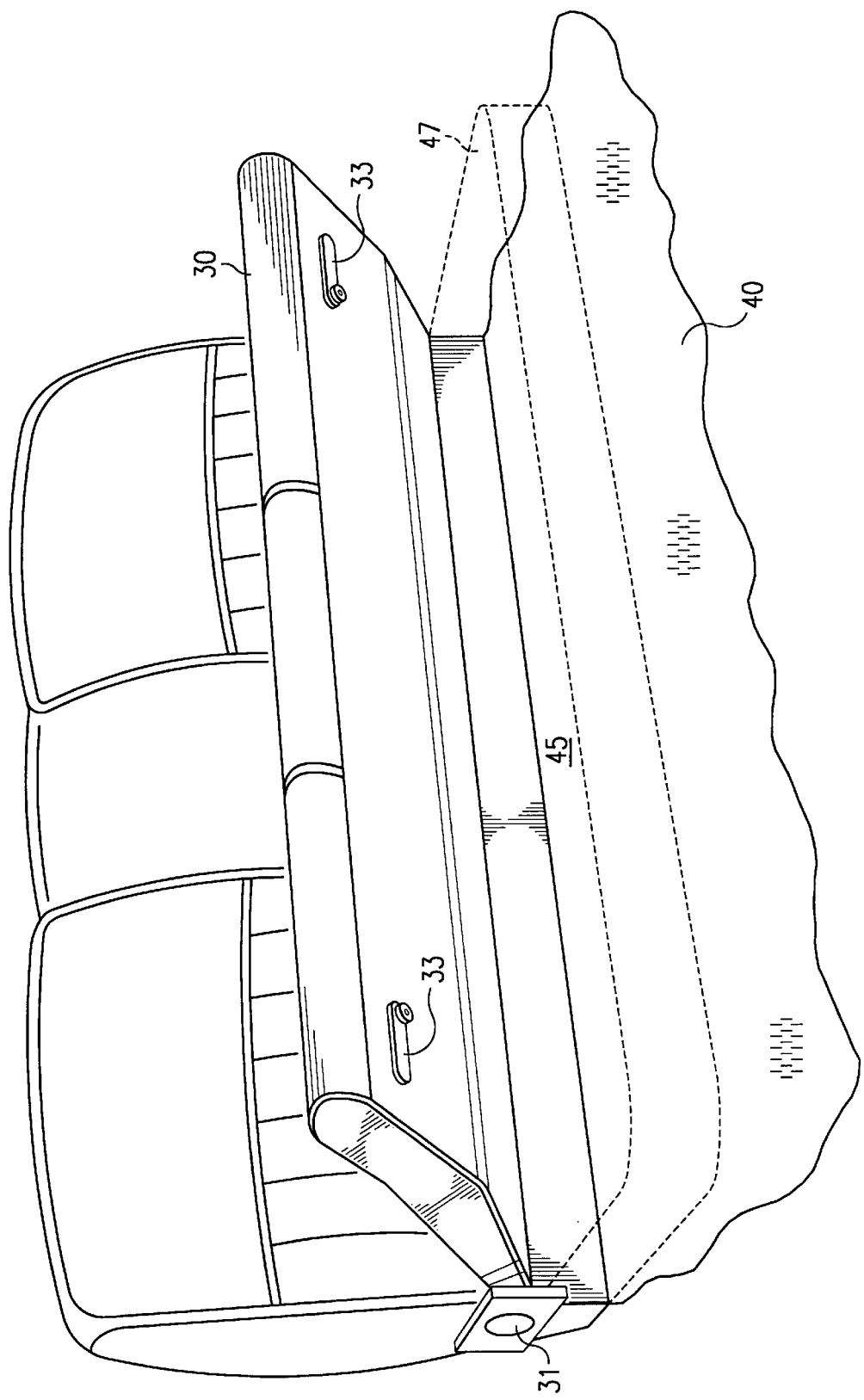
FIG. 2 is a detail perspective view of the passenger seat of FIG. 1 in a partially side elevation of the enclosure showing the seat part or the seat in a partially raised position and the storage space.

Referring now to FIG. 2, a perspective view is shown of the passenger seat under which it is desired to provide a secure, lockable enclosure according to the teachings of the present invention. As shown in FIG. 2, the seat part 30 (or some portion thereof) may be hinged at pivot points 31 (one of which is shown) for movement between a first lowered (i.e., a working) position, and a second raised or folded position shown in solid lines. Thus, the seat part is pivotal between the first lowered position and the second raised position offset from the first lowered position by some angle, which may extend up to about 90 degrees.

Pivoting of the seat is accomplished by actuating one of a pair of handles 33 underlying the seat. One handle 33 is accessible from the left side of the seat (when facing rearward), while the other handle is accessible from the right side of the seat. In a vehicle with two rear doors (a so-called four (4) door), typically the seat will include both handles. In a vehicle with a single rear door (a so-called third door), the seat will also include a pair of handles, but it may include just one handle. In any case, the handle(s) are connected to control a known actuating mechanism for enabling the seat (or some portion thereof) to hinge about pivots 31 from its first, lowered position to its second, raised position. As shown in the drawing, the handles 33 are typically spaced from each other and located adjacent the outer ends of the seat.

When the seat part is located in the first lowered position, a volume 45 of storage space exists between the seat and the floor 40 accessible though an opening 47 extending below, across and around at least a portion of the seat part (shown in dotted line). The opening below the seat front may extend around the sides of the seat as well depending on the type of seat, the manufacturer, the cab design, the restraining belt design or mechanism, the existence of a second, third or fourth door, and the like. In some cases (e.g., in the Dodge Ram™ Quad Cab), a seatbelt mechanism underlies the seat adjacent the rear or back wall of the cab and, thus, the "opening" under the seat does not extend fully around the entire seat. In other cases (e.g., in a three door cab configuration), there may only be a single seatbelt mechanism and, thus, the opening extends under the seat along the front underside of the seat and under one side.

Figure 3:
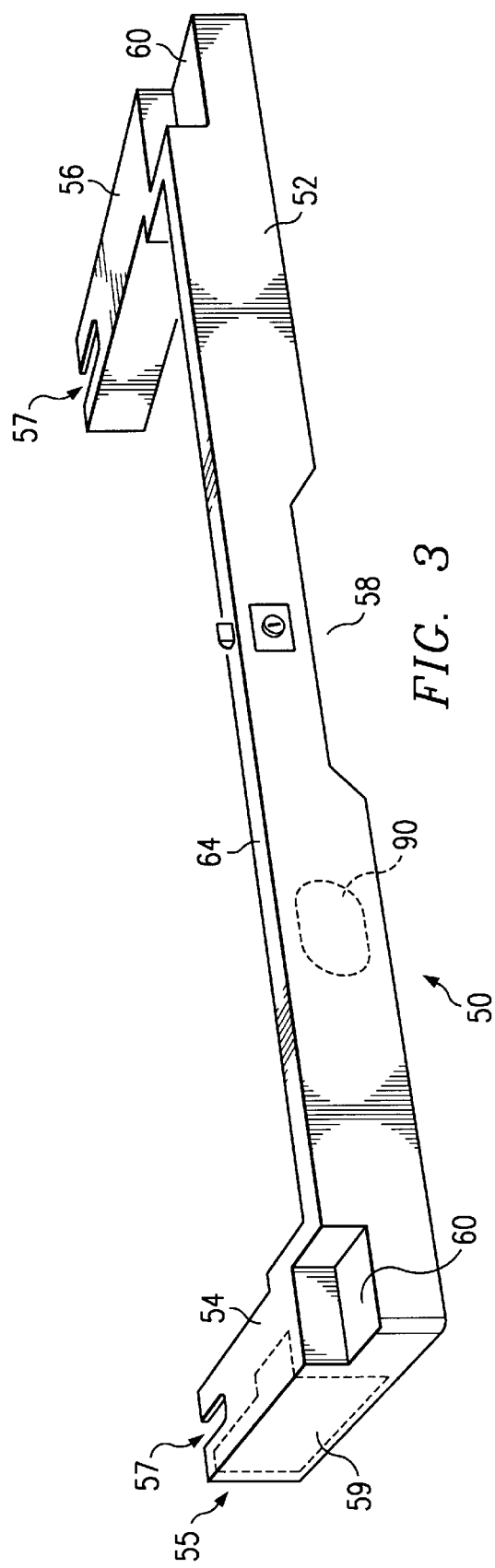
FIG. 3 is a perspective view of a first embodiment of the structural member of the invention.

Irrespective of whether the opening is one-sided or two-sided, the present invention augments this existing construction with a structural member 50 such as shown in FIG. 3. Preferably, the structural member 50 is substantially u-shaped having a front or "bight" portion 52, and first and second side portions 54 and 56. In some cases, depending on the cab configuration and underlying seat construction, first and second side portions, or one of them, may be omitted or foreshortened. Front portion 52, and first and second side portions 54 and 56, are preferably integrally-molded of a rigid structural material such as a rigid molded plastic (e.g., a high density polyethylene (HDPE) or other polymer or copolymer material). Alternatively, the member, may be formed of separate, attached pieces or components. One or both of the first and second side portions include a rearward directed opening 55 that is designed to mate with or be secured to the underlying seat support (which may include or comprise the underlying seatbelt mechanism or housing). A slot 57 in the upper surface of each side portion 54 and 56 may be required to enable the structural member to slide into the existing seat structural configuration. As illustrated, an outer portion 59 (shown in dotted lines) of one or both side portions may also be omitted.

The structural member may be secured against movement merely by a close interference fit between the side portion(s) and the underlying seat structures. Alternatively, the member is secured to the vehicle floor (and/or, the underlying structures) using conventional fasteners. One particular embodiment uses several L-shaped brackets attached to an inner wall of the member 50, with the bottom edge of each bracket fastened to the floor using a bolt. Any other conventional fastening mechanism can be used. Thus, the structural member is restrained against movement and, preferably, is locked in position substantially as shown.

The structural member also includes an opening 58 to accommodate the transmission or drive shaft clearance tunnel wall. Further, at each end of the structural member 50, there is a rectangular-shaped cutout or notch 60 to accommodate the handles 33 of the seat/bench when the latter is in the lowered position. These notches enable the user to raise the seat if a locking mechanism is not engaged.

Figure 4:
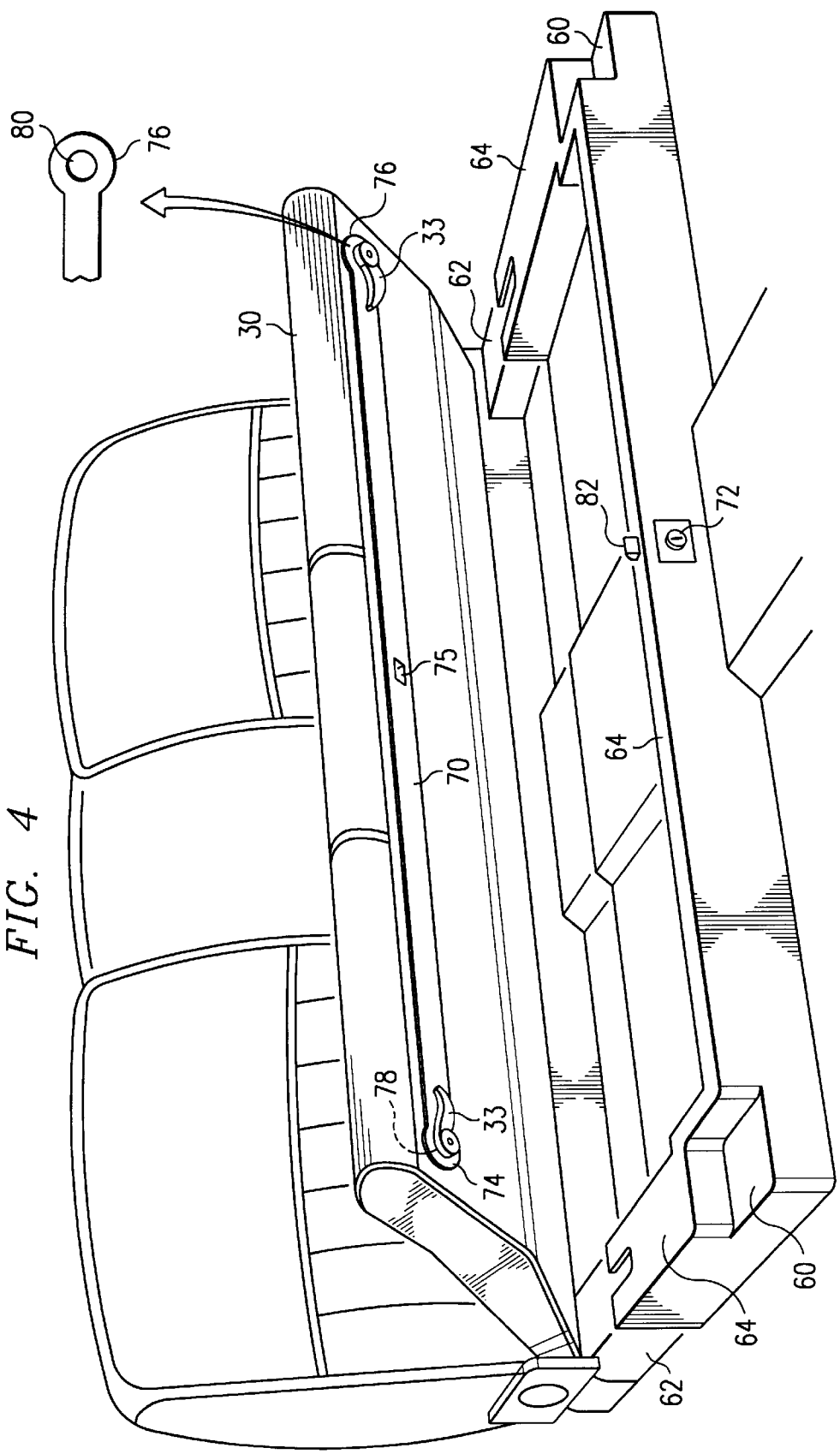
FIG. 4 is a perspective view of the first embodiment of the structural member during installation.
Figure 5:
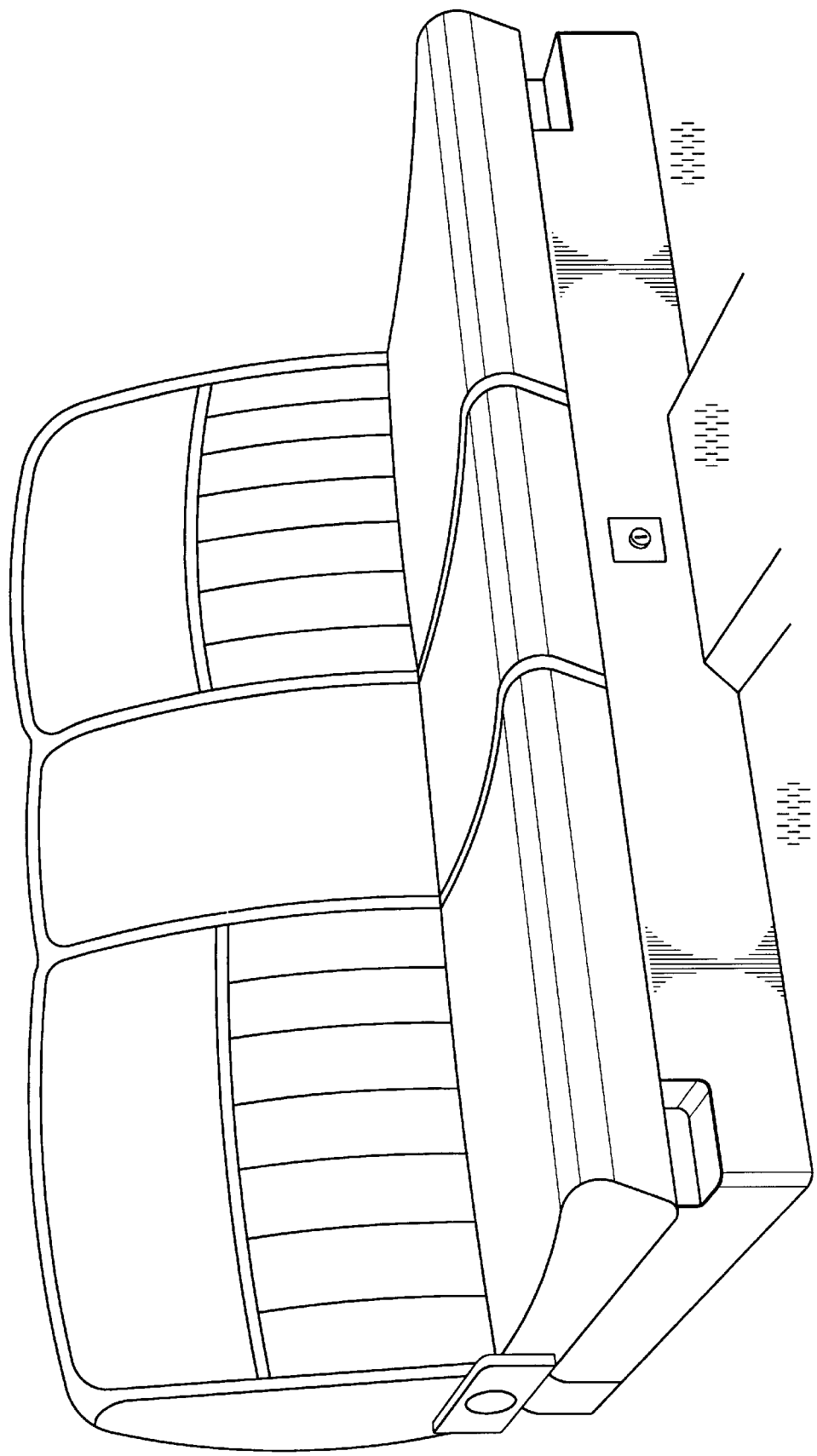
FIG. 5 is a perspective view of the first embodiment of the structural member following installation and with the seat or bench in the down, locked position to create the security enclosure.

Thus, with reference now to FIGS. 4–5, the structural member is installed by fitting the side portions 54 and 56 to mate or engage with the underlying, existing seat supports or seatbelt mechanisms 62. In some cases (as noted above), depending on the vehicle cab construction and/or the number of doors, one side portion may have a different configuration than the other side portion. As seen in FIG. 5, once the structural member is installed in this manner, the seat or bench may be lowered adjacent the top edge 64 of the enclosure. FIG. 5 illustrates how the handles 33 are accommodated by the cutout or notches 60. In this manner, the structural member 50 thus encloses the volume of storage space underlying the seat or bench.

Figure 6:
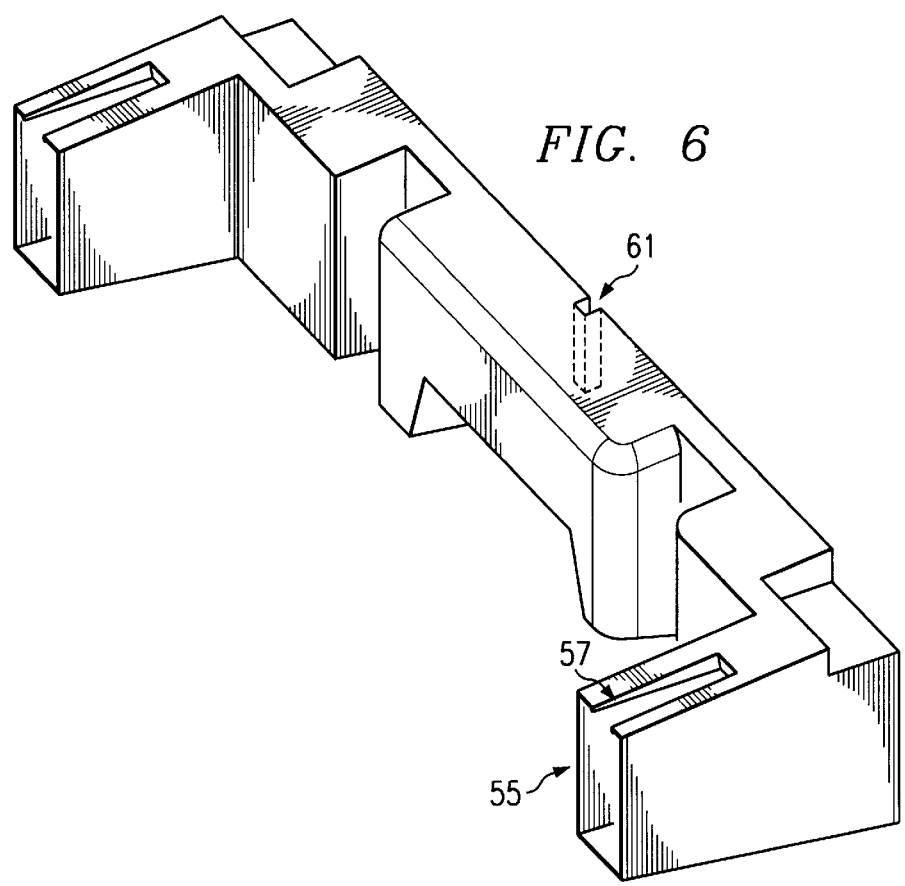
FIG. 6 is a perspective view a first alternate embodiment of the present invention.
Figure 7:
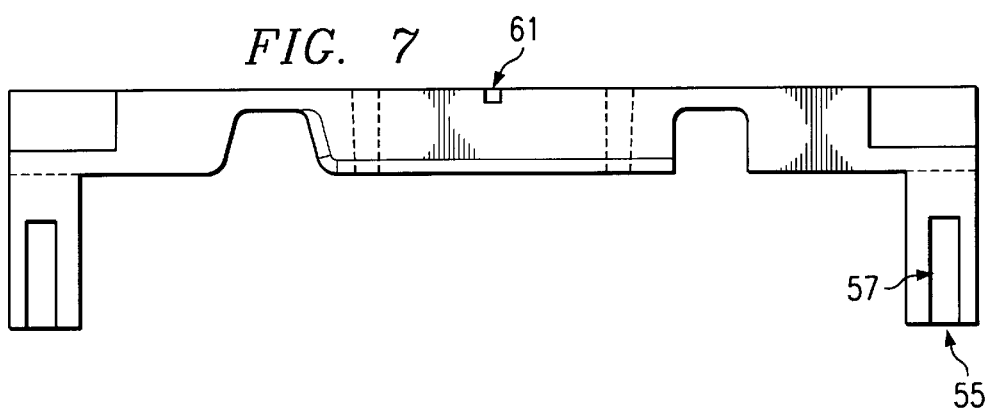
FIGS. 7–8 are plan and elevation views of the first alternate embodiment of the present invention.
Figure 8:
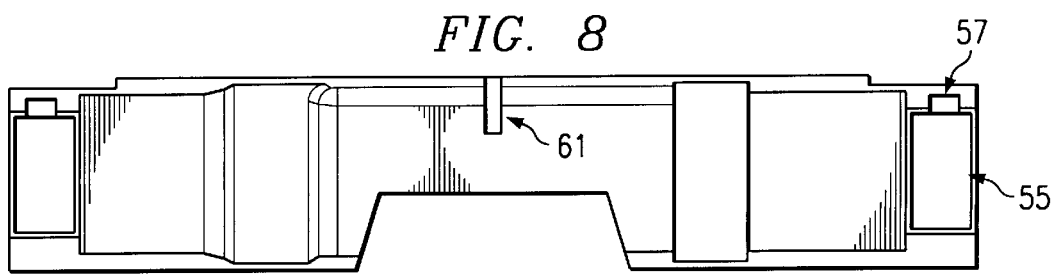

The actual shape of the structural member may be altered to "fit" to the particular underseat configuration with which the member is configured. FIGS. 6–8 illustrate a preferred structural configuration for one particular vehicle, the Dodge Ram™ Quad Cab. This configuration is not to be taken to limit the invention, however, this particular configuration illustrates the openings 55 and slots 57 in the side portions that facilitate installation and retaining of the member under the bench. The embodiment also includes a notch 61 in the front portion for receiving a locking element as will be described.

Referring back to FIG. 4, a locking mechanism is also provided to secure the enclosure against wrongful entry when the seat 30 is in the first lowered position. A preferred locking mechanism includes two parts, a locking bar 70 secured to the underside of the seat, and a key lock 72 supported within the structural member. The locking bar 70 includes first and second ends 74 and 76 that include openings 78 and 80. Bar 70 also includes opening 75 into which a latch (described below) is reciprocated to "engage" the locking mechanism. The bar 70 is positioned by removing handles 33 and placing openings 78 and 80 over the handle stems that support the handles. The handles are then re-attached. This positions the opening 75 directly above a latch 82 that is extensible from the key lock 72. The key lock 72 is of conventional design and includes a housing in which the latch 82 is disposed. The mechanism controls the retraction of the latch that cooperates with the opening 75 in the locking bar. Of course, any conventional locking device may be used, and the components of the locking mechanism may be reversed. Alternatively, a locking mechanism that is not built into the member 50 is used to restrain the seat against upward movement when the mechanism is engaged.

The present invention provides numerous advantages. The structural member creates a lockable enclosure under an existing seat or bench. When the structural member is used (even without the locking mechanism), it further acts as a barrier to prevent substantial movement of articles located below the seat. This significantly reduces rattle and noise.

The storage area created by the member may be subdivided into one or more areas for storing objects of different sizes, configurations, and the like. This can be accomplished by using divider or partition walls that have appropriate tabs and/or slots that are interconnected to form storage compartments. Compartments may be formed by suitable dividers or intermediate partition walls.

As noted above, the structural member is preferably made of rigid, molded plastic material. Alternatively, the member may be fabricated using conventional engineering materials suitable for motor vehicles including fabricated sheet metal and similar materials used for vehicle interior structural members including trim panels and the like. If desired, the structural may be covered with a decorative material (i.e., "carpeted" or otherwise "cushioned") to provide a pleasing appearance that is otherwise compatible with the vehicle interior. One or more openings 90 (see FIG. 4) may be used to support an audio speakers so that a vehicle sound system may be incorporated into the secure enclosure (whether or not the locking mechanism is used).

Although preferred embodiments of the invention have been described in detail herein, those skilled in the art will recognize that various substitutions and modifications may be made without departing from the scope and spirit of the appended claims. Thus, for example, the structural member may be appropriately sized to fit under a fractional portion (½- or ¾-size) of the bench.

I claim:

1. In a motor vehicle having a floor, and a seat including a seat part pivotal between a first lowered position and a second raised position upon actuation of an underlying handle, wherein when the seat part is located in the first lowered position a volume of storage space exists between the seat and the floor accessible though an opening, the improvement comprising:

a structural member supported in the opening for inhibiting access to the volume of storage space through the opening when the seat part is located in the first lowered position, the structural member having a notch so that the underlying handle remains accessible when the seat part is in the first lowered position; and means for locking the seat part in its first lowered position to thereby form a secure enclosure within the volume of space;

wherein, when the locking means is not engaged, the underlying handle may be grasped and actuated even when the seat part is in the first lowered position.

2. The improvement as described in claim 1 wherein the means for locking comprises:

a first member supported in the structural member; and a second member attached to an underside of the seat part for engaging a locking element of the first member to engage the locking means.

3. An article of manufacture for use in a motor vehicle having a floor, and a seat including a seat part pivotal between a first lowered position and a second raised position upon actuation of an underlying handle, wherein when the seat part is located in the first lowered position a volume of storage space exists between the seat and the floor accessible though an opening, comprising:

a structural member supported in the opening for inhibiting access to the volume of storage space through the opening when the seat part is located in the first lowered position, the structural member having a notch so that the underlying handle remains accessible when the seat part is in the first lowered position; and means for locking the seat part in its first lowered position to thereby form a secure enclosure within the volume of space;

wherein, when the locking means is not engaged, the underlying handle may be grasped and actuated even when the seat part is in the first lowered position.

4. The article of manufacture as described in claim 3 wherein the means for locking comprises:

a first member supported in the structural member; and a second member attached to an underside of the seat part for and including a locking element for engaging the first member to engage the locking means.

5. The article of manufacture as described in claim 3 wherein the structural member is formed of rigid, molded plastic.

6. The article of manufacture as described in claim 3 wherein the structural member comprises:

a front member; and at least one side member integrally formed with the front member and including a rearward opening to accommodate an underseat structure.

7. The article of manufacture as described in claim 6 wherein the front member includes a notch to accommodate a raised tunnel wall in the floor.

8. The article of manufacture as described in claim 3 wherein the structural member includes an opening for receiving an audio speaker for a vehicle sound system.

* * * * *